UNITED STATES PATENT OFFICE.

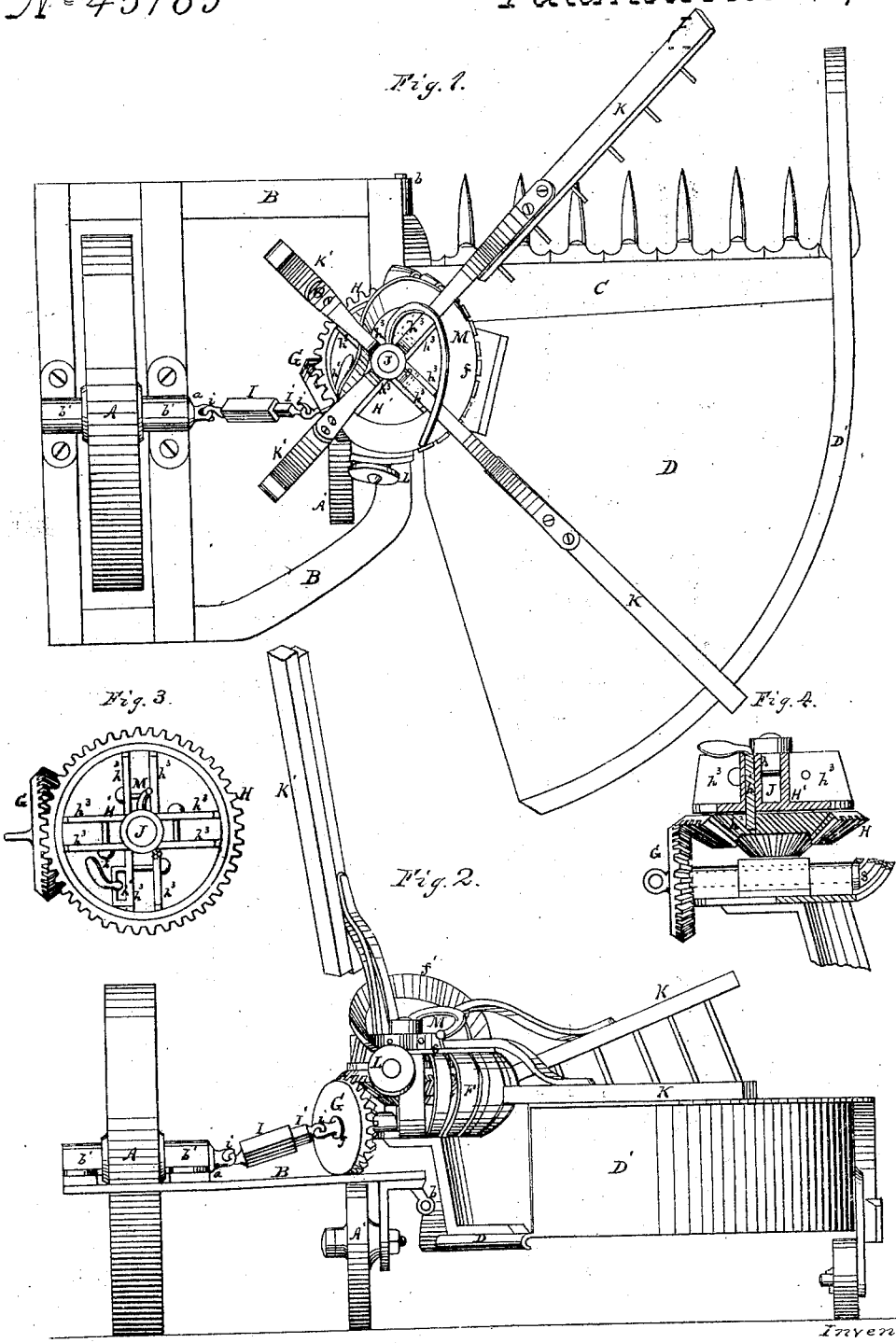

WM. T. SHAW AND JOHN MANZ, OF WILMINGTON, DELAWARE.

IMPROVEMENT IN RAKING ATTACHMENTS TO HARVESTERS.

Specification forming part of Letters Patent No. 45,185, dated November 22, 1864.

*To all whom it may concern:*

Be it known that we, WILLIAM T. SHAW and JOHN MANZ, of Wilmington, in the county of New Castle and State of Delaware, have invented certain new and useful Improvements in Harvesters; and we do hereby declare the following to be a full and exact description of the same, reference being had to the accompanying drawings, making part of this specification, in which—

Figure 1 is a plan of a harvester embodying our invention. Fig. 2 is a rear end view of the same. Fig. 3 is a detached top view of the rake-head and gear-wheel which imparts motion thereto, and Fig. 4 is a sectional elevation of the same.

Similar letters of reference indicate corresponding parts in the several figures.

Our invention consists, first, in a novel combination of independent sweep-rakes and extensible tumbling-shaft, adapted to compensate for the rising and falling of the outer end of the finger-beam and of the grain-platform, and to effectually transmit motion from the main driving-wheel under all conditions of the parts, while permitting them to freely conform to irregularities of the ground; secondly, in means for causing the rakes and reels to move only in one direction and remain at rest when the machine is backed; thirdly, in the employment of a frame of simple and cheap construction for governing the motion of the rake and reels, for protecting the operating parts from straw, trash, &c.; fourthly, in a device whereby the upward motion of the rake is initiated and insured in such a manner as to prevent injury to any of the operating parts.

In order that others skilled in the art to which our invention appertains may be enabled to fully understand and use the same, we will proceed to describe its construction and operation.

In the accompanying drawings, A A' represent the carrying-wheels, and B a frame mounted thereon, the frame being jointed or hinged at $b$ $b$ to the finger-beam C and platform D in order that the two parts of the machine thus connected may vibrate vertically independently of each other, so as to insure the efficient operation of the machine when passing over irregular and uneven ground.

E is a strong metallic standard, securely fastened by screws or otherwise to the grain-platform, and inclined so as to project partially over the frame B. This standard supports the frame F within which the rake-head and its appurtenances are located, and by which the gearing is prevented from becoming choked with straw and trash.

G is a bevel-gear wheel, placed at right angles to and meshing with a crown gear-wheel, H, upon which rests the rake-head H'. The gear-wheel G is journaled on the end of a shaft, $g$, which has a firm and secure bearing in a corresponding cylindrical box or socket secured to the bottom of the frame F.

I I' is a tumbling-shaft, which is connected at its respective ends by universal joints $i$ $i$ to the shaft $a$, upon which the driving-wheel A is mounted, and to the gear-wheel G, said shaft $a$ being journaled in boxes $b'$ $b'$ on the frame B. The tumbling-shaft is formed in two parts, I I', respectively, the solid part I' fitting within and rotating with the hollow part I, both parts being made square, or in any other adequate form to effect their simultaneous rotation. The solid piece I' may slide freely within the socket I, and this it does when the outer end of the finger-beam, with the outer side of the platform, falls or rises independently of the frame B. It is immaterial whether the piece I' be entirely within the socket I or only partially therein—the rotation of the two will continue equally well in either condition—and hence when the finger-beam and platform assume a position lower than that which the frame B occupies, and the distance between the gear-wheel G and wheel A increases, the piece I' receives the same lateral movement as said gear-wheel, and is thus partially withdrawn from the socket I; but inasmuch as a portion of the piece I' remains within the socket I the latter imparts motion to the former as well on the finger-beam thus falling as when it occupies its normal position, and hence the operation of the rakes is maintained at all times, under all conditions of the ground, when the parts are in gear. The connecting of the tumbling-shaft I I' directly to the main driving-shaft $a$ obviates the employment of any additional appliance in transmitting motion to the operating parts, and said tumbling-shaft, beside performing its function in a most perfect manner, may be constructed cheaply and applied readily.

The crown gear-wheel H, while it may be said to form part of the rake-head, is not conjoined thereto. The rake-head H' is placed upon the same shaft, J, that the gear-wheel H rotates upon, and the said head has in it a vertical aperture, $h$, for the reception of a coupling bar or key, $h'$, which, passing down through the aperture $h$, enters a cavity or recess, $h^2$, in the crown-gear H, (see Fig. 4,) which recess in its vertical section may be likened to a triangle, the base of which may be supposed to be formed by the top of said crown-gear. One side of this recess $h^2$ is perpendicular and constitutes a shoulder for the key $h'$, and the other side is oblique, as clearly represented.

When the parts are put in motion in consequence of the moving forward of the machine, the vertical side of the recess $h^2$ bears against the key $h'$ and causes the wheel H and rake-head H' to rotate together; but when the motion is produced by a reverse or backward movement of the machine, then the oblique side of the recess $h^2$ presses against the key $h'$, and instead of the rotary movement of the wheel H being imparted to the key it is caused to ascend until it is entirely out of the recess, the rake-head H' remaining in a stationary condition, and the lower end of the key $h'$ resting on the top of the wheel H, which the latter turns. A continuation of the backward movement of the machine brings the revolving recess $h^2$ directly beneath the key $h'$, which then falls into the recess only to be raised out of the same as before, without communicating the motion of the wheel H to the head H', and so long as the machine moves backward the rake-head will remain at rest—that is to say, it will receive no rotary movement. On the starting forward of the machine the wheel H is rotated as before, and when the key $h'$ enters the recess $h^2$ it remains therein and is acted upon directly by the perpendicular side of said recess, the effect of which is to couple the wheel H and rake-head H', and cause the two to rotate together. Thus the rakes K K and reels K' K' are caused to sweep over the platform in customary manner during the forward movement of the machine, and to discontinue their operation during the backward movement. The chief object in thus suspending the operation of the rakes is to prevent them from throwing the grain toward the front of the machine, where it might become entangled in the guides of the cutter-bar, and interfere with the movement of the latter.

The rake-head H' is formed or provided with flanges $h^3$, a pair being provided for each rake and reel, and the whole being disposed in the form of a cross, as illustrated in Fig. 3. The arms of the rakes and reels are each pivoted between two of the flanges $h^3$, so that the rakes and reels may undergo free vertical vibration, the flanges so confining the arms of said rakes and reels as to prevent them from moving horizontally independently of the rake-head; or, in other words, the effect of the employment of the flanges is to cause horizontal movement of the rakes and reels to conform to that of the rake-head H'. The arms of the rakes and reels project over and rest upon the top $f f'$ of the frame F, said top constituting a "guide," by which term it will be hereinafter designated, for the sake of elucidation. A portion, $f$, of this guide on the frame F is horizontal, and the remainder deflected upward into the oblique position represented. While the rake and reel-arms are traversing the horizontal portion $f$, the rakes and reels assume a proper position to sweep over the platform D horizontally; but when the said arms move in contact with the oblique part $f'$ the rakes and reels are elevated and returned in a vertical or nearly vertical plane to the front of the platform.

At the point on the guide $f f'$ at which the arms begin to ascend, the curvature is of such an abrupt character that the movement of the rakes and reels might be impeded, and the parts injured if the said arms were permitted to move in contact with the guide at this curvature. To prevent the occurrence of such deleterious results, we employ a roller or revolving disk, L, which is pivoted at the juncture of the parts $f f'$ of the frame where the rake and reel-arms begin to ascend, and which allows the arms to be carried over the abrupt curvature without coming in contact with the guide at the point where such curvature occurs. Thus the upward movement of the rakes and reels is initiated and facilitated, the roller rotating upon its axis to permit the arms to pass on freely in the desired direction, all opposition to their movement being by this expedient effectually prevented.

M is a strong rigid rod attached to the top of the shaft J, and when the rakes and reels are in operation they pass under this rod or stay M while moving over the platform, and by it they are held down to their proper working position. In the absence of this retaining device M the rakes and reels would be liable to be thrown or deflected upward by contact with the grain, and hence their work would be performed in an ineffectual manner.

The rim D' of the platform D is of such height, and the rakes K and reels K' are arranged in such relation thereto, that in moving over the platform their ends rest upon and are supported by said rim. In regard to the reels, it need only be said that by thus causing them to rest upon the rim they are adapted to be steady and regular in their motion, and their arms are relieved of undue strain. The same remark will apply to the rakes; but in addition to this it will be observed that their teeth are effectually kept clear of the cutter, and are always held out of contact with the platform, while they project to a point within suitable proximity thereto to insure the removal of the grain. It is apparent that the teeth of the rakes, being thus held out of contact with the platform, cannot become bent or broken, which frequently occurs in harvesting-machines heretofore devised, in consequence of the teeth moving or scraping against the platform at every sweep.

It may be here remarked that the entire frame F can be formed in one piece, and it is of very simple construction. It prevents the gearing from becoming choked with straw and trash.

Having thus described our invention, the following is what we claim as new therein and desire to secure by Letters Patent—

1. The extensible tumbling-shaft I I', attached directly to the main driving-shaft $a$, in combination with the gearings G H and independently-hinged rakes K K, arranged and operating as and for the purposes herein specified.

2. The revolving head H H', made in two disconnected parts, adapted to be coupled and uncoupled by means of the key $h'$ and recess $h^2$, so as to cause the rakes to operate when the machine is moving forward and to remain at rest during the backward movement thereof.

3. The frame or casing F, formed with the guide $f\,f'$ for controlling the movement of the rakes and reels, as described.

4. In combination with the aforesaid guide $f\,f'$, the roller L, arranged and operating, substantially as described, to initiate and assist in the elevation of the rake and reel-arms, as and for the object specified.

WILLIAM T. SHAW.
JOHN MANZ.

Witnesses:
SAML. BIDDLE,
A. RAATS.